US010511375B2

(12) United States Patent
Niu et al.

(10) Patent No.: US 10,511,375 B2
(45) Date of Patent: Dec. 17, 2019

(54) IP CAMERA WITH WIRELESS RELAY FUNCTION

(71) Applicant: Realtek Semiconductor Corp., Hsinchu (TW)

(72) Inventors: Yanpeng Niu, Chiang Su Sheng Su Chou (CN); Mingming Wu, Chiang Su Sheng Nan Ching (CN); Yahui Cao, Chiang Su Sheng Nan Ching (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 140 days.

(21) Appl. No.: 15/499,411

(22) Filed: Apr. 27, 2017

(65) Prior Publication Data

US 2017/0317737 A1 Nov. 2, 2017

(30) Foreign Application Priority Data

Apr. 28, 2016 (CN) .......................... 2016 1 0278822

(51) Int. Cl.
*H04B 7/155* (2006.01)
*H04L 12/46* (2006.01)
(Continued)

(52) U.S. Cl.
CPC ......... *H04B 7/155* (2013.01); *H04L 12/4625* (2013.01); *H04L 65/4069* (2013.01); *H04L 61/1511* (2013.01); *H04L 61/2015* (2013.01); *H04N 5/38* (2013.01); *H04N 5/44* (2013.01); *H04W 92/04* (2013.01)

(58) Field of Classification Search
CPC . H04B 7/155; H04L 12/4625; H04L 65/4069; H04L 65/4076; H04L 61/1511; H04L 61/2015; H04N 5/232; H04N 5/38; H04N 5/44; H04W 92/04
See application file for complete search history.

(56) References Cited

U.S. PATENT DOCUMENTS 9,117,164 B2 * 8/2015 Park ..................... G06K 15/405
2006/0095539 A1 * 5/2006 Renkis .................... H04W 4/70 709/217

(Continued)

FOREIGN PATENT DOCUMENTS

CN 103840875 A 11/2012
TW 201010303 3/2010

*Primary Examiner* — Blake J Rubin

(74) *Attorney, Agent, or Firm* — Muncy, Geissler, Olds & Lowe, P.C.

(57) ABSTRACT

An IP camera with a wireless relay function includes a lens, a wireless client interface, a wired client interface, a Wi-Fi SoftAP interface, and a bridge interface. The lens receives image data. The wireless client interface transmits the image data to a first wireless client device through a wireless network. The wired client interface transmits the image data to a first wired client device through a wired network. The Wi-Fi SoftAP interface is a virtual interface to be connected to a second wireless client. The bridge interface uses the Wi-Fi SoftAP interface to communicate with the second wireless client, and connects the Wi-Fi SoftAP interface to the wired client interface or the wireless client interface, so that the second wireless client device obtains an IP address and connects to Internet through the wired client interface or the wireless client interface.

9 Claims, 4 Drawing Sheets

(51) Int. Cl.

| | |
|---|---|
| ***H04L 29/06*** | (2006.01) |
| *H04L 29/12* | (2006.01) |
| *H04N 5/38* | (2006.01) |
| *H04N 5/44* | (2011.01) |
| *H04W 92/04* | (2009.01) |

(56) References Cited

U.S. PATENT DOCUMENTS

2008/0005626 A1* 1/2008 Schaff .................. G06F 1/3203 714/48
2010/0295512 A1* 11/2010 Zhao .................... H04W 88/08 320/128
2011/0153798 A1* 6/2011 Groenendaal .......... H04L 63/20 709/223
2011/0285863 A1* 11/2011 Burke ............... H04N 5/23206 348/207.1
2012/0044354 A1* 2/2012 Cheng ............... H04N 5/23203 348/159
2012/0162445 A1* 6/2012 Kim ..................... H04L 63/029 348/207.1
2013/0057908 A1* 3/2013 Park ................... H04L 61/2015 358/1.15
2013/0318587 A1* 11/2013 Shamsspoor ......... H04W 12/06 726/7
2014/0028435 A1* 1/2014 Brockway, III .... H04N 1/00315 340/3.1
2014/0085480 A1* 3/2014 Saptharishi ........ H04N 21/4621 348/159
2014/0085666 A1* 3/2014 Park .................... G06K 15/405 358/1.15
2014/0269400 A1* 9/2014 Aldana ................ G01S 5/0081 370/253
2014/0325085 A1* 10/2014 Moritomo .......... H04L 65/1013 709/229
2014/0327936 A1* 11/2014 Busch .................. G06F 3/1292 358/1.15
2014/0348073 A1* 11/2014 Elhaddad ............. H04W 72/08 370/329
2015/0031404 A1* 1/2015 Yada .................... H04W 76/25 455/508
2015/0128054 A1* 5/2015 Sugimoto .......... G06F 9/44505 715/736
2015/0264740 A1* 9/2015 Hiramatsu .............. H04B 5/02 455/41.1
2015/0350346 A1* 12/2015 Fujita ................... H04W 4/008 709/224
2015/0381859 A1* 12/2015 Cover ................. H04N 5/2252 348/374
2016/0043895 A1* 2/2016 Hwang ................ H04W 12/06 370/338
2016/0344664 A1* 11/2016 Pahuja .................... H04L 51/04
2016/0360160 A1* 12/2016 Eizenberg .......... G06Q 30/0207
2017/0054594 A1* 2/2017 Decenzo ................. H04L 67/12
2017/0064408 A1* 3/2017 Ketola ................ G06F 21/6218
2017/0070543 A1* 3/2017 Balasubramanian ........................ H04L 65/1069
2017/0094581 A1* 3/2017 Sun ....................... H04L 45/745
2017/0134182 A1* 5/2017 Davis ...................... H04W 4/70
2017/0195280 A1* 7/2017 Lindsey ................ H04L 61/103
2017/0300277 A1* 10/2017 Kosuda ................. G06F 3/1203

* cited by examiner

IP CAMERA WITH WIRELESS RELAY FUNCTION

BACKGROUND OF THE INVENTION

Field of the Invention

The invention relates to an IP camera, and more particularly to an IP camera having a wireless relay function.

Description of the Related Art

A conventional IP camera has a wireless network function for a client or clients, wherein the wireless network function is enabled to transmit an image to a user. Referring to FIG. 1, a conventional IP camera 100 includes a lens module 101, a wireless client interface 102 and a wired client interface 103.

The wireless client interface 102 and the wired client interface work independently. After receiving an image from the lens module 101, the wireless client interface 102 transmits the image to a wireless client device through a wireless network. After receiving the image from the lens module 101, the wired client interface 103 transmits the image to a wired client device through a wired network. Generally speaking, most of the wired networks and the wireless networks adopt the dynamic host configuration protocol (DHCP). The wired network is connected to Ethernet through the wired network with the higher priority. This IP camera is implemented with the lower complexity, but does not have the wireless relay function. When a user at a longer distance wants to use the wireless network, the user has to purchase a wireless access point device or a wireless repeater additionally. Thus, the user has to increase the cost in trouble.

Therefore, how to provide an IP camera with a wireless relay function to function as a relay point for wireless network transmission to provide wireless access functions for other wireless apparatuses is a problem to be urgently solved.

SUMMARY OF THE INVENTION

An object of the invention is to provide an IP camera, which has a wireless relay function and a wireless network module and can provide a client mode and a wireless access point mode at the same time, so that the IP camera can provide a wireless relay access function for other wireless apparatuses without the hardware cost being increased, and the competition ability of the product can be enhanced.

The IP camera according to the embodiment of the invention itself can access Internet through a wired network module or a wireless network module. However, in order to possess the wireless relay function, the wireless network module must work in the wireless client mode and the wireless access point mode at the same time, and the data of the wired network mode or the wireless client mode has to be forwarded to the wireless access point mode, so that the wireless access point mode can provide the Internet access function for other wireless apparatuses. The invention uses the software bridge method and creates the data stream forwarding rule to implement the coexistence of the client mode of the wireless network and the wireless access point mode, and the data transmission function therebetween without increasing the hardware.

An embodiment of the invention provides an IP camera having a wireless relay function and including a lens, a wireless client interface, a wired client interface, a Wi-Fi SoftAP interface and a bridge interface. The lens receives image data. The wireless client interface transmits the image data to a first wireless client device through a wireless network. The wired client interface transmits the image data to a first wired client device through a wired network. The Wi-Fi SoftAP interface is a virtual interface to be connected to a second wireless client device. The bridge interface uses the Wi-Fi SoftAP interface to communicate with the second wireless client device and connect the Wi-Fi SoftAP interface to the wired client interface or the wireless client interface, so that the second wireless client device obtains an IP address and connects to Internet through the wired client interface or the wireless client interface.

The IP camera according to the embodiment of the invention can achieve the effect of providing the wireless relay function, so that the second wireless client device can perform the network data access while obtaining the IP address, and can provide the wireless access function for other wireless apparatuses to solve the conventional problem.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

Figure 1:
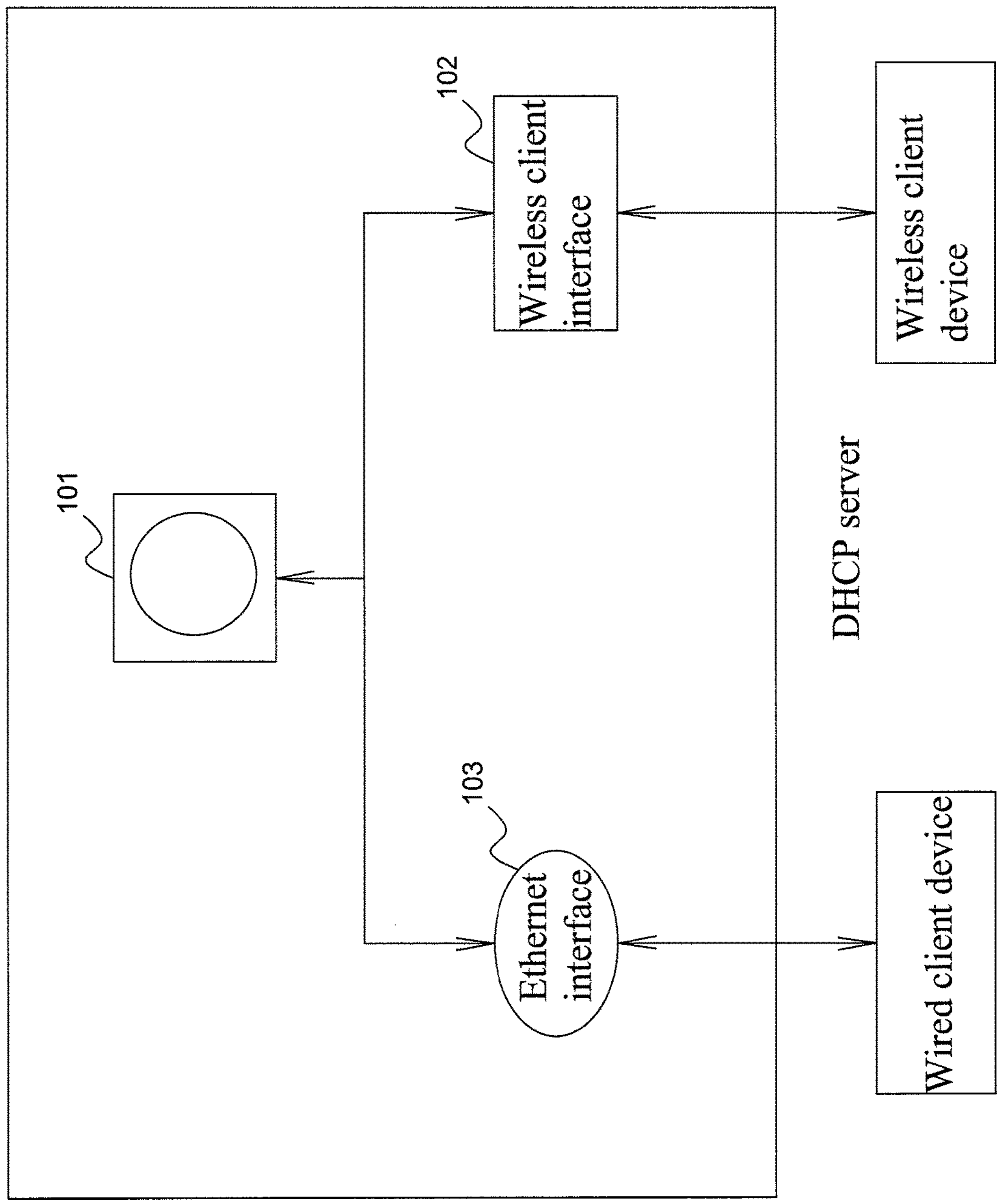
FIG. 1 is a schematic view showing a conventional IP camera.
Figure 2:
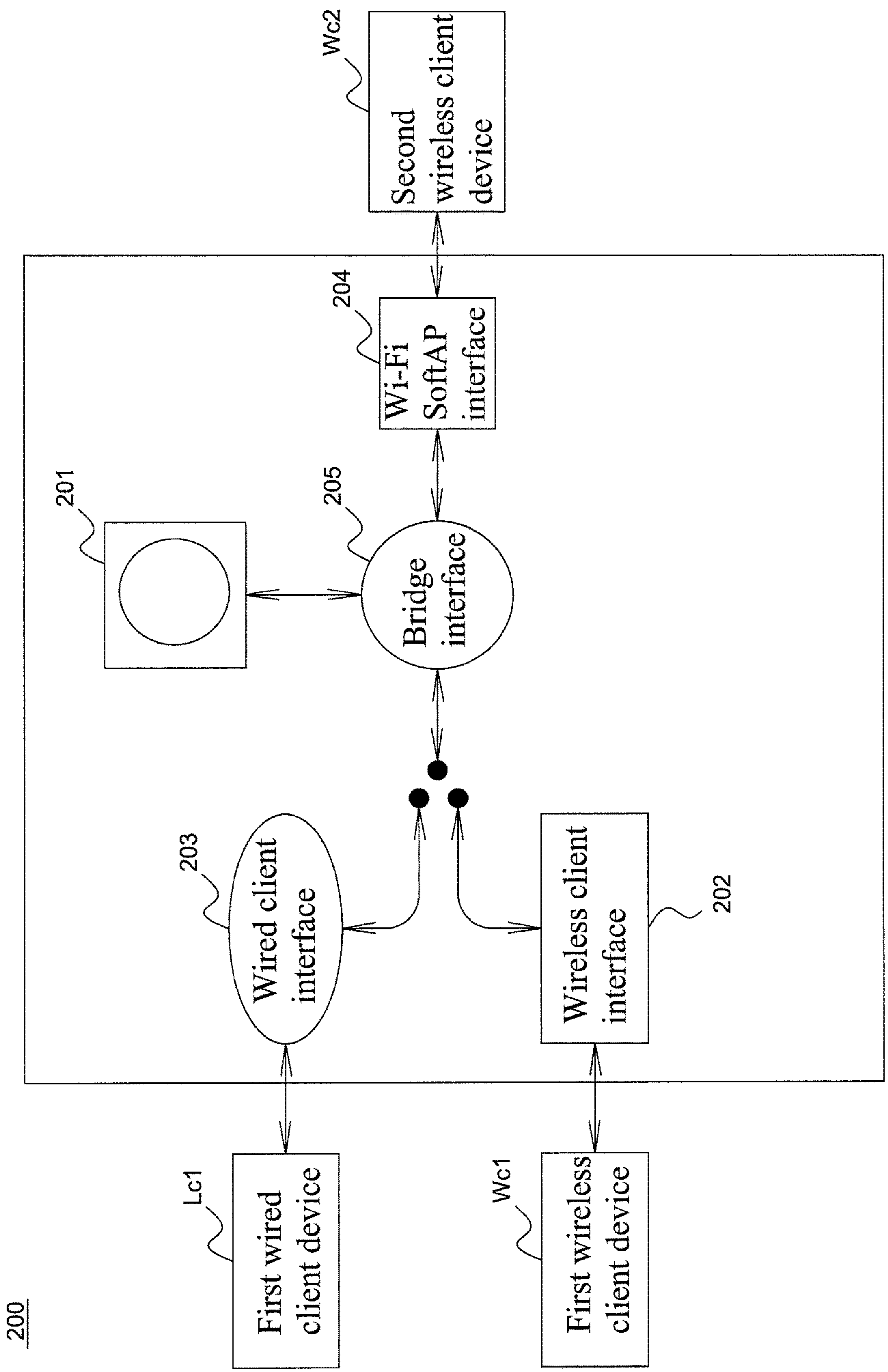
FIG. 2 is a schematic view showing an IP camera according to an embodiment of the invention.

FIG. 2 is a schematic view showing an IP camera 200 according to an embodiment of the invention. Referring to FIG. 2, the IP camera 200 includes a lens 201, a wireless client interface 202, a wired client interface 203, a Wi-Fi SoftAP interface 204 and a bridge interface 205.

The lens 201 receives image data. The wireless client interface 202 transmits the image data to a first wireless client device Wc1 through a wireless network. The wired client interface 203, such as an Ethernet interface, transmits the image data to a first wired client device Lc1 through a wired network. The Wi-Fi SoftAP interface 204 is a virtual interface to be connected to a second wireless client device Wc2. The bridge interface 205 uses the Wi-Fi SoftAP interface 204 to communicate with the second wireless client device Wc2, and connects the Wi-Fi SoftAP interface 204 to the wired client interface 203 or the wireless client interface 202, so that second wireless client device Wc2 obtains an Internet Protocol (IP) address IP and connects to Internet through the wired client interface 203 or the wireless client interface 202.

Upon operation, the Wi-Fi SoftAP interface 204 receives a broadcast request of the second wireless client device Wc2, and the bridge interface 205 forwards the broadcast request to the wired client interface 203 or the wireless client interface 202. The wired client interface 203 or the wireless client interface 202 receives a dynamic host configuration protocol (DHCP) request, and then provides the DHCP request to the second wireless client device Wc2 through the bridge interface 205 according to the broadcast request to obtain an IP address IP and provide the IP address IP to the second wireless client device Wc2.

It is to be noted that when the bridge interface 205 forwards the broadcast request to the wired client interface 203 or the wireless client interface 202, the wired client interface 203 or wireless client interface 202 finally transmits the broadcast request to the DHCP server (not shown) corresponding to the wired client interface 203 or the wireless client interface 202. The DHCP server receives the broadcast request and then replies the DHCP request to the bridge interface 205 to perform the operations of obtaining the subsequent IP address IP and transmitting the data.

In this manner, the IP camera 200 according to the embodiment of the invention can achieve the effect of providing the wireless relay function, so that when the second wireless client device Wc2 obtains the IP address IP, the second wireless client device Wc2 can perform the network data access to provide the wireless access function for other wireless apparatuses, and to solve the conventional problem.

In the above-mentioned embodiment, the IP camera of the invention pertains to a bridge mode, in which if the second wireless client device Wc2 accessed by the user using the IP camera 200 through the Wi-Fi SoftAP interface 204 uses the method of dynamically acquiring the network address, and the IP camera 200 is not connected to a superior router. Thus, the apparatus connected to the IP camera through the wireless hotspot cannot access the IP camera 200 itself.

In another embodiment, the IP camera of the invention can implement the wireless relay function through a wireless Internet service provider (WISP) mode, and can solve problem that the apparatus connected to the IP camera cannot access the IP camera. The network architecture of the WISP mode is shown in FIG. 3.

Figure 3:
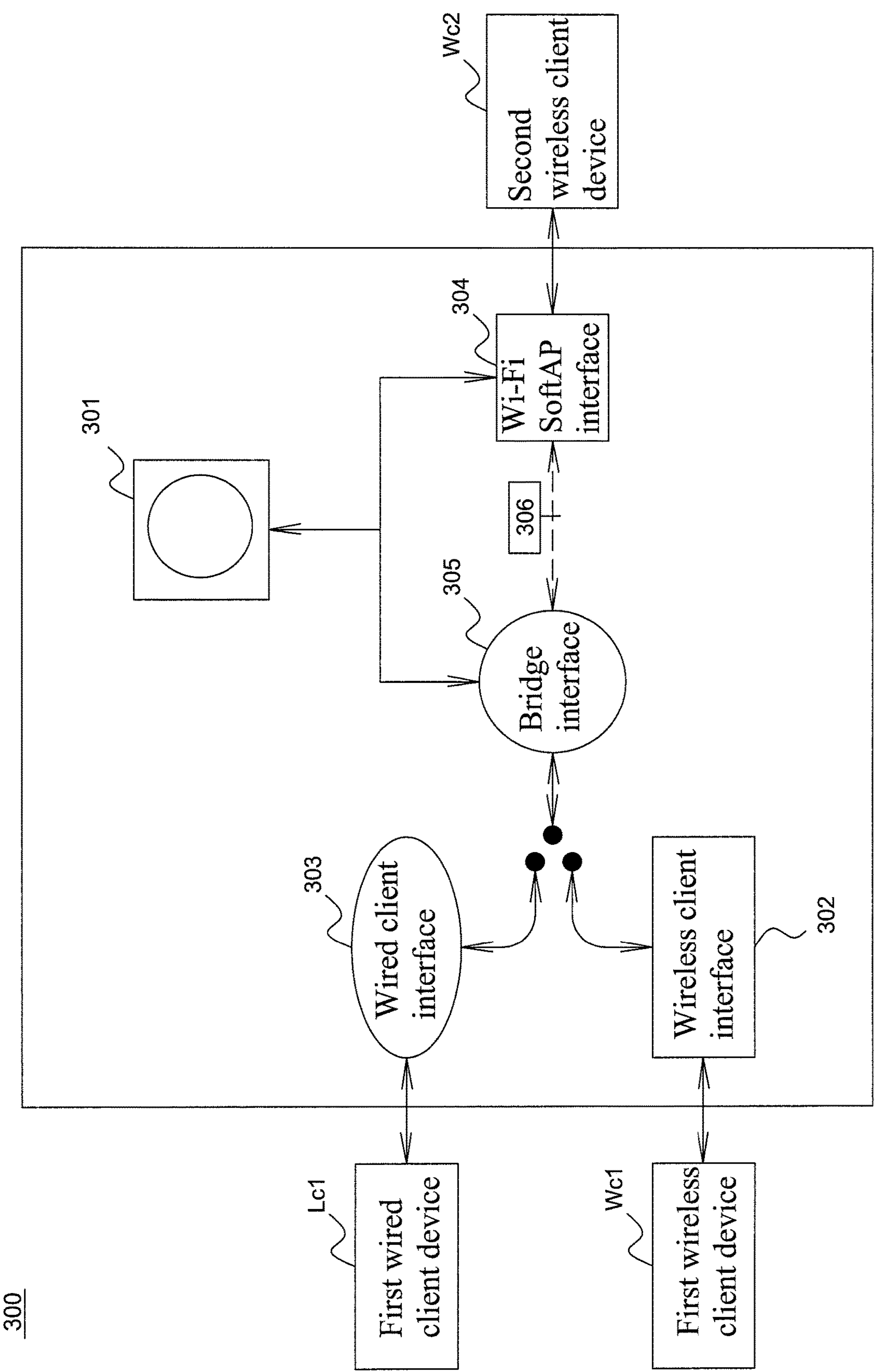
FIG. 3 is a schematic view showing an IP camera according to another embodiment of the invention.

An IP camera 300 of FIG. 3 includes a lens 301, a wireless client interface 302, a wired client interface 303, a Wi-Fi SoftAP interface 304, a bridge interface 305 and a data communication unit 306. The IP camera 300 and the IP camera 200 are substantially the same except for the difference that the IP camera 300 has the data communication unit 306, and that the Wi-Fi SoftAP interface 304 and the bridge interface 305 of the IP camera 300 have no actual correlation, and execute the transmission through the data communication unit 306 on a user level. The data communication unit 306 is implemented using a third-party open-source-tool IP address table (IPTABLE) and a dynamic domain name system (DDNS).

Upon operating in the WISP mode, the IP address IP of the IP camera 300 is allocated by an superior router to which the IP camera 300 is connected, and the Wi-Fi SoftAP interface 304 of the IP camera 300 enables the DHCP server, and the IP address IP of the second wireless client device Wc2 accessed through the wireless hotspot can be allocated by the IP camera 300. Furthermore, after the second wireless client device Wc2 is connected to the Wi-Fi SoftAP interface 304 of the IP camera 300, the second wireless client device Wc2 transmits a DHCP request to the Wi-Fi SoftAP interface 304, and the Wi-Fi SoftAP interface 304 operates the DHCP server to reply the DHCP request to the second wireless client device Wc2 to allocate the IP address IP.

It is to be noted that in the IP camera 300 according to the embodiment of the invention in the WISP mode, the IP address IP of the virtual bridge interface 305 is allocated by the superior router to which the IP camera 300 is connected, and the Wi-Fi SoftAP interface 304 of the IP camera 300 has the enabled DHCP server, and the IP address IP of the wireless apparatus accessed through the wireless hotspot is allocated by the IP camera 300 itself. When the IP camera 300 functions as a wireless relay point, the provided IP address IP is the private local area network information, and the allocated DNS server is designated as the IP address IP of Wi-Fi SoftAP interface 304. The DNS request within the the private local network area is forwarded by the DNS relay domain name relay daemon (Dnrd) to the upper router which is connected with IP camera 300.

An embodiment of operating the DNS will be described in the following. When the user inputs the website address on the second wireless client device Wc2, the second wireless client device Wc2 transmits the DNS request to the Wi-Fi SoftAP interface 304, and the Dnrd receives the request and then forwards the request to the superior DNS server. The superior DNS server receives the request and then returns the analyzed DNS to the Dnrd. The Dnrd receives the analyzed DNS and then forwards the data to the Wi-Fi SoftAP interface 304, and the Wi-Fi SoftAP interface 304 transmits the analyzed DNS to the second wireless client device Wc2 to complete the DNS analysis.

Furthermore, the forwarding of the IP camera 300 of the embodiment of the invention from the private local area network to the IP address is implemented according to the network address translation (NAT) function through the IPTABLE tool. Meanwhile, the superior router connected through the IP camera also cannot obtain the information of the wireless apparatus accessed through the Wi-Fi SoftAP interface, and this can preferably ensure the network security of the apparatus.

In this manner, the IP camera 300 of the embodiment of the invention can achieve the effect of providing the wireless relay function, so that when the second wireless client device Wc2 obtains the IP address IP, the second wireless client device Wc2 can access the network data to provide the wireless access function for other wireless apparatuses to solve the conventional problem.

Figure 4:
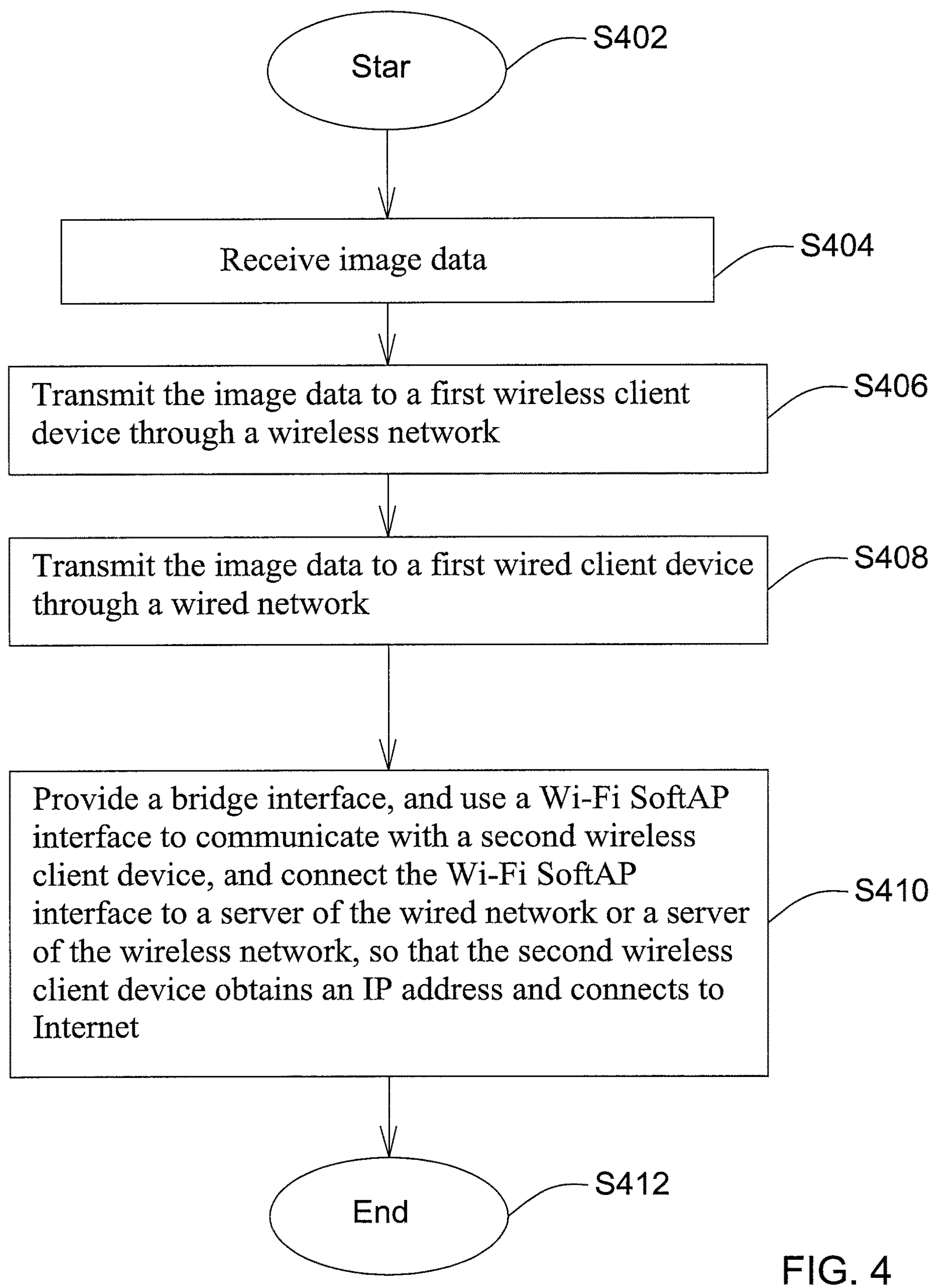
FIG. 4 is a flow chart showing a wireless relay method applicable to an IP camera according to another embodiment of the invention.

FIG. 4 is a flow chart showing a wireless relay method applicable to an LP camera according to another embodiment of the invention. Referring to FIG. 4, the method includes the following steps.

In step S402, the method starts.

In step S404, the image data is received.

In step S406, the image data is transmitted to a first wireless client device through a wireless network.

In step S408, the image data is transmitted to a first wired client device through a wired network.

In step S410, a bridge interface is provided, wherein a Wi-Fi SoftAP interface is used to communicate with a second wireless client, and to connect the Wi-Fi SoftAP interface to a server of the wired network or a server of the wireless network, so that the second wireless client device obtains the IP address and connects to Internet.

In step S412, the method ends.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. An IP camera with a wireless relay function, the IP camera comprising:

a lens receiving image data;

a wireless client interface transmitting the image data to a first wireless client device through a wireless network;

a wired client interface transmitting the image data to a first wired client device through a wired network;

a Wi-Fi SoftAP interface being a virtual interface to be connected to a second wireless client device; and a bridge interface, which uses the Wi-Fi SoftAP interface to communicate with the second wireless client device and connect the Wi-Fi SoftAP interface to the wired client interface or the wireless client interface, so that the second wireless client device obtains an IP address and connects to Internet through the wired client interface or the wireless client interface, wherein transmission on the Wi-Fi SoftAP interface and the bridge interface of the IP camera in a WISP mode is performed through a data communication unit; the data communication unit is implemented using a third-party open-source-tool IP address table (IPTABLE) and a dynamic domain name system (DDNS); the IP camera from a private area network to the IP address is implemented according to a network address translation (NAT) function through the IPTABLE.

2. The IP camera according to claim 1, wherein the Wi-Fi SoftAP interface receives a broadcast request of the second wireless client device, and the bridge interface forwards the broadcast request to the wired client interface or the wireless client interface, wherein after the wired client interface or the wireless client interface receives a DHCP request according to the broadcast request, the wired client interface or the wireless client interface provides the DHCP request to the second wireless client device, and obtains and provides the IP address to the second wireless client device through the bridge interface.

3. The IP camera according to claim 2, wherein when the bridge interface forwards the broadcast request to the wired client interface or the wireless client interface, the wired client interface or the wireless client interface finally transmits the broadcast request to a DHCP server corresponding to the wired client interface or the wireless client interface, wherein the DHCP server receives the broadcast request and then replies the DHCP request to the bridge interface.

4. The IP camera according to claim 1, wherein in the WISP mode, an IP address of the bridge interface is allocated by a superior router to which the IP camera is connected, the Wi-Fi SoftAP interface of the IP camera enables a DHCP server, and the IP address of the second wireless client device accessed through a wireless hotspot is allocated by the IP camera.

5. The IP camera according to claim 1, wherein after the second wireless client device is connected to the Wi-Fi SoftAP interface of the IP camera, the second wireless client device transmits a DHCP request to the Wi-Fi SoftAP interface, and the Wi-Fi SoftAP interface operates a DHCP server and replies the DHCP request to the second wireless client device to allocate the IP address.

6. The IP camera according to claim 5, wherein the IP address is private area network information, and an allocated DNS server is designated as the IP address monitored by a DNS relay domain name relay daemon (Dnrd) operated by the Wi-Fi SoftAP interface.

7. The IP camera according to claim 6, wherein the Dnrd is used to forward a DNS request.

8. The IP camera according to claim 6, wherein when a user inputs a website address on the second wireless client device, the second wireless client device transmits a DNS request to the Wi-Fi SoftAP interface, the Dnrd receives the DNS request and then forwards the DNS request to a superior DNS server, the superior DNS server receives the DNS request and then returns an analyzed DNS to the Dnrd, the Dnrd receives the analyzed DNS and then forwards the analyzed DNS to the Wi-Fi SoftAP interface, and the Wi-Fi SoftAP interface transmits the analyzed DNS to the second wireless client device to complete a DNS analysis.

9. A wireless relay method applicable to an IP camera, the method comprising:

receiving image data;

transmitting the image data to a first wireless client device through a wireless network;

transmitting the image data to a first wired client device through a wired network; and providing a bridge interface, and using a Wi-Fi SoftAP interface to communicate with a second wireless client device, and connect the Wi-Fi SoftAP interface to a server of the wired network or a server of the wireless network, so that the second wireless client device obtains an IP address and connects to Internet, wherein transmission on the Wi-Fi SoftAP interface and the bridge interface of the IP camera in a WISP mode is performed through a data communication unit; the data communication unit is implemented using a third-party open-source-tool IP address table (IPTABLE) and a dynamic domain name system (DDNS); the IP camera from a private area network to the IP address is implemented according to a network address translation (NAT) function through the IPTABLE.

* * * * *